United States Patent
Nagel et al.

(10) Patent No.: US 10,081,262 B2
(45) Date of Patent: Sep. 25, 2018

(54) CHARGING STATION HAVING A CHARGING CABLE WITH ELECTRIC CONTACT WITHIN A FLUID DUCT

(71) Applicant: Dr. Ing. h.c. F. Porsche Aktiengesellschaft, Stuttgart (DE)

(72) Inventors: Thomas Nagel, Waldbronn-Busenbach (DE); Dirk Remisch, Mönsheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 39 days.

(21) Appl. No.: 15/221,006

(22) Filed: Jul. 27, 2016

(65) Prior Publication Data
US 2017/0028862 A1 Feb. 2, 2017

(30) Foreign Application Priority Data
Jul. 29, 2015 (DE) .......................... 10 2015 112 347

(51) Int. Cl.
*H02J 7/00* (2006.01)
*H02J 7/14* (2006.01)
(Continued)

(52) U.S. Cl.
CPC ....... *B60L 11/1818* (2013.01); *B60L 11/1825* (2013.01); *H01B 9/006* (2013.01);
(Continued)

(58) Field of Classification Search
CPC ...................................................... H02J 7/025
(Continued)

(56) References Cited

U.S. PATENT DOCUMENTS

| 5,591,937 A | 1/1997 | Woody |
| 5,909,099 A * | 6/1999 | Watanabe ............ A61K 31/726 |
| | | 320/108 |

(Continued)

FOREIGN PATENT DOCUMENTS

| CN | 103828177 A | 5/2014 |
| DE | 102010007975 | 8/2011 |

(Continued)

OTHER PUBLICATIONS

English translation of Chinese Office Action for corresponding Chinese Application No. 2016106061690, dated Jun. 2, 2017, 3 pages.

(Continued)

*Primary Examiner* — Edward Tso
*Assistant Examiner* — Ahmed Omar
(74) *Attorney, Agent, or Firm* — RatnerPrestia

(57) ABSTRACT

A charging station having a charging cable for charging an electric energy store, the charging cable being connected to the charging station at a proximal end and having a first plug-in apparatus at a distal end for connecting to a second plug-in apparatus of an apparatus to be charged which contains an electric energy store, the first plug-in apparatus having first electric contact elements for electric connection to second electric contact elements of the second plug-in apparatus, the charging cable having electrically connecting lines for electric connection of the first contact elements to a voltage source of the charging station, the charging cable having a fluid duct for guiding a fluid from the charging station toward the first plug-in apparatus and from the first plug-in apparatus back to the charging station again.

12 Claims, 4 Drawing Sheets

(51) Int. Cl.
  *B60L 11/18*   (2006.01)
  *H01B 9/00*   (2006.01)
  *H01B 7/42*   (2006.01)

(52) U.S. Cl.
  CPC .......... *B60L 2230/12* (2013.01); *H01B 7/423* (2013.01); *Y02T 10/7005* (2013.01); *Y02T 10/7088* (2013.01); *Y02T 90/121* (2013.01); *Y02T 90/128* (2013.01); *Y02T 90/14* (2013.01)

(58) Field of Classification Search
  USPC ........................................................ 320/108
  See application file for complete search history.

(56) References Cited

U.S. PATENT DOCUMENTS

| | | | |
|---|---|---|---|
| 8,098,044 B2 * | 1/2012 | Taguchi | ............. B60L 11/1816 320/109 |
| 2013/0029193 A1 | 1/2013 | Dyer et al. | |
| 2014/0062397 A1 | 3/2014 | Dyer et al. | |

| | | | |
|---|---|---|---|
| 2015/0217654 A1 * | 8/2015 | Woo | ................... B60L 11/1818 320/109 |

FOREIGN PATENT DOCUMENTS

| | | |
|---|---|---|
| DE | 102011100389 | 5/2012 |
| EP | 0823766 | 2/1998 |
| JP | H10106362 A | 4/1998 |

OTHER PUBLICATIONS

English translation of Korean Office Action for corresponding Korean Application No. 10-2016-0096338, dated Aug. 7, 2017, 3 pages.
German Search Report for German Application No. 10 2015 112 347.9, dated May 9, 2016 with partial translation. dated 2016.
English translation of Japanese Office Action for corresponding Japanese Patent Application No. 2016-147276, dated Mar. 22, 2017.
Rusian Office Action for Russian Application No. 2016124992, dated Apr. 26, 2016, 1 page.

\* cited by examiner

CHARGING STATION HAVING A CHARGING CABLE WITH ELECTRIC CONTACT WITHIN A FLUID DUCT

CROSS-REFERENCE TO RELATED APPLICATIONS

This application claims priority to German Patent Application No. 10 2015 112 347.9, filed Jul. 29, 2015, which is incorporated by reference herein in its entirety.

FIELD OF THE INVENTION

The invention relates to a charging station having a charging cable, in particular for charging an electric energy store of a motor vehicle.

BACKGROUND OF THE INVENTION

Motor vehicles having an electric motor as drive motor have to be charged at charging stations, in order that they can store the necessary energy for a journey of the motor vehicle. To this end, the motor vehicle has an electric energy store and a plug-in apparatus which can be connected by means of a charging cable with a correspondingly compatible plug-in apparatus to a charging station, in order for it to be possible to charge the electric energy store. Here, the electric energy stores are often supplied with a high voltage charge current.

Since the electric energy stores can heat up to a pronounced extent in charging operations of this type, which might be detrimental to the power output and the service life of the energy store, cooling options have been disclosed in the prior art, by means of which the electric energy store can be cooled.

DE 10 2010 007 975 B4, which is incorporated by reference herein, discloses a charging station having a charging cable, in which a cooling device with a coolant line which can be connected to it is also provided in the charging station, it being possible for the coolant line to be connected to the motor vehicle, in order to feed a coolant to the energy store, in order for it to be possible to cool the latter. Here, the electric cable for the electric charge current is kept separate from the coolant line.

It has been shown, however, that the quality of the electric contact between the vehicle-side plug-in apparatus and the charging station-side plug-in apparatus is variable, in particular, even in the case of changing exterior conditions and even during the charging operation, and said electric contact can become worse during the charging operation, with the result that the plug-in apparatus can be heated to an undesirably pronounced extent and the charging operation can be impaired disadvantageously as a result, which is either manifested in a lower charging capacity after the charging or which can lead to lengthening of the charging duration.

SUMMARY OF THE INVENTION

It is an object of the present invention to provide a charging station having a charging cable which is improved in comparison with the prior art and is nevertheless of simple construction.

This object is achieved by way of the features of a charging station having a charging cable for charging an electric energy store, the charging cable being connected to the charging station at a proximal end and having a first plug-in apparatus at a distal end for connecting to a second plug-in apparatus of an apparatus to be charged which contains an electric energy store, the first plug-in apparatus having first electric contact elements for electric connection to second electric contact elements of the second plug-in apparatus, the charging cable having electrically connecting lines for electric connection of the first contact elements to a voltage source of the charging station, wherein the charging cable has a fluid duct for guiding a fluid from the charging station toward the first plug-in apparatus and from the first plug-in apparatus back to the charging station again.

One exemplary embodiment of the invention relates to a charging station having a charging cable for charging an electric energy store, the charging cable being connected to the charging station at a proximal end and having a first plug-in apparatus at a distal end for connecting to a second plug-in apparatus of an apparatus to be charged which contains an electric energy store, such as, in particular, a motor vehicle, the first plug-in apparatus having first electric contact elements for electric connection to second electric contact elements of the second plug-in apparatus, the charging cable having electrically connecting lines for electric connection of the first contact elements to a voltage source of the charging station, the charging cable having a fluid duct for guiding a fluid from the charging station toward the first plug-in apparatus and from the first plug-in apparatus back to the charging station again. This achieves a situation where the temperature of the charging cable itself and also of the first plug-in apparatus of the charging cable can be controlled by way of the fluid flow through the fluid duct. In the case of excessively high temperatures, the fluid flow can be used for cooling, with the result that the charging cable and the first plug-in apparatus are cooled. At low temperatures, the fluid flow can also be used for heating the charging cable and, in particular, the first plug-in apparatus. This achieves a situation where the electric contact of the first plug-in apparatus with a second plug-in apparatus lies thermally in a range which permits a suitable transmission of electric energy.

It is also advantageous if the fluid duct has a first part fluid duct and has a second part fluid duct which open in the region of the first plug-in apparatus into a deflecting duct, in which a fluid from the first part duct downstream of the charging station is deflected into the second fluid duct, in the flow direction toward the charging station. As a result, a throughflow is achieved in the charging cable from the charging station past the plug-in apparatus and through the latter back to the charging station again. This permits a connection to a circuit of the fluid for cooling the charging cable.

It is particularly advantageous if the first contact elements engage into the first part fluid duct, into the second part fluid duct and/or into the deflecting duct and/or are connected thermally to the latter. As a result, the temperature of the contact elements can be controlled directly or indirectly in order to bring about the electric contact with a second plug-in connection, which helps to keep the temperature of the latter in a desired temperature window. This promotes the electric contact and the transmission of electric energy, such as a current flow via the contact elements.

It is likewise expedient if the contact elements are flowed around at least partially by the fluid. As a result, direct temperature control of the contact elements can take place if they reach at least partially into the corresponding fluid duct or deflecting duct.

It is also expedient if the charging station has a part fluid circuit with at least one fluid pump or a fluid compressor for loading a fluid through the first part fluid duct toward the deflecting duct and from the deflecting duct back through the second part fluid duct, in particular to the part fluid circuit. As a result, a fluid can be provided which can flow through the charging cable through the corresponding fluid ducts.

It is particularly advantageous if the charging station, the part fluid circuit and/or the part fluid duct have means for controlling the temperature of the fluid. The fluid can thus be preconditioned itself in advance to a suitable temperature for the optimum temperature control of the charging cable and the contact elements.

It is advantageous here if the means for controlling the temperature have a heating means for heating the fluid and/or cooling means for cooling the fluid. As a result, the fluid can be heated or cooled, with the result that the desired temperature of the charging cable and/or the contact elements can be achieved.

It is also advantageous if the fluid is air which can be sucked in, in particular, from the exterior space of the charging station, or is another gas or gas mixture or a liquid which can be sucked in from a reservoir.

It is particularly advantageous if, in addition to the electrically connecting lines, the charging cable also has the part fluid ducts, the electrically connecting lines being in thermal connection with the part fluid ducts. Temperature control of the electrically connecting lines can thus take place over the length of the charging cable, with the result that its temperature can likewise be stabilized over its length.

BRIEF DESCRIPTION OF THE DRAWINGS

In the following text, the invention will be explained in detail using one exemplary embodiment with reference to the drawing, in which.

DETAILED DESCRIPTION OF THE INVENTION

Figure 1:
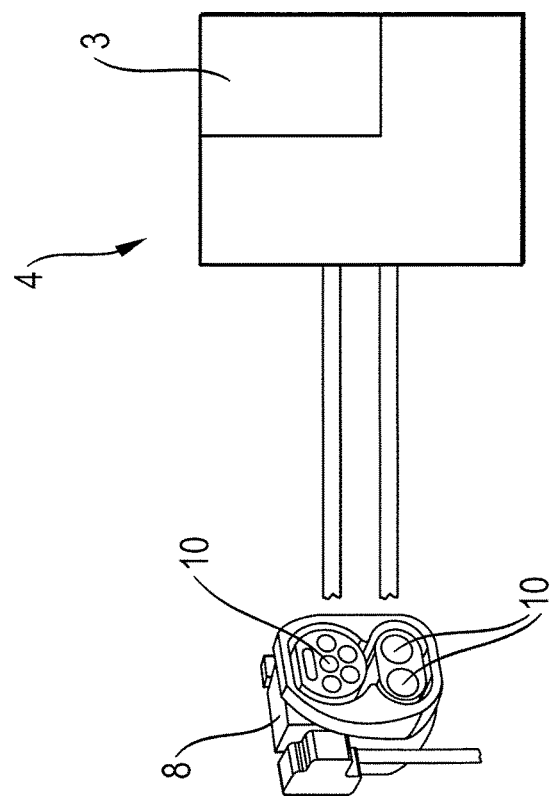
FIG. 1 shows a diagrammatic illustration of a configuration of an apparatus which has an electric energy store, with a charging station having a charging cable.
Figure 1:
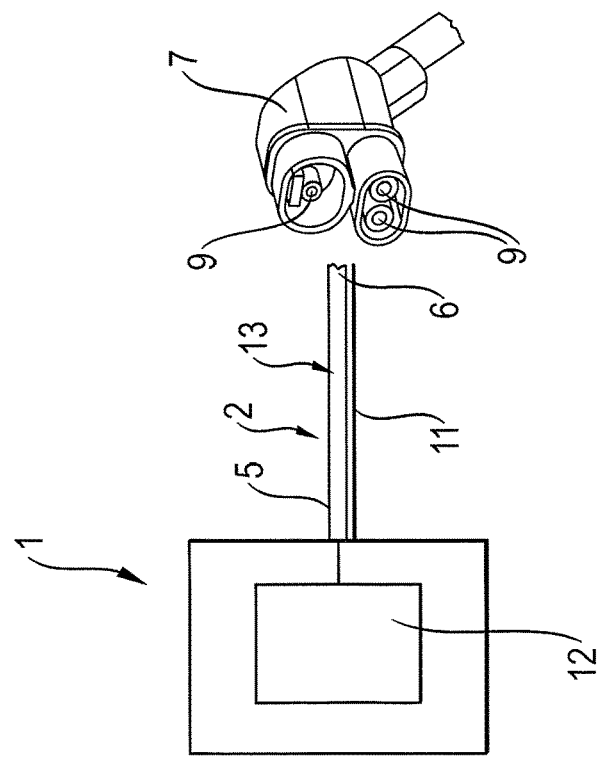
Figure 2:
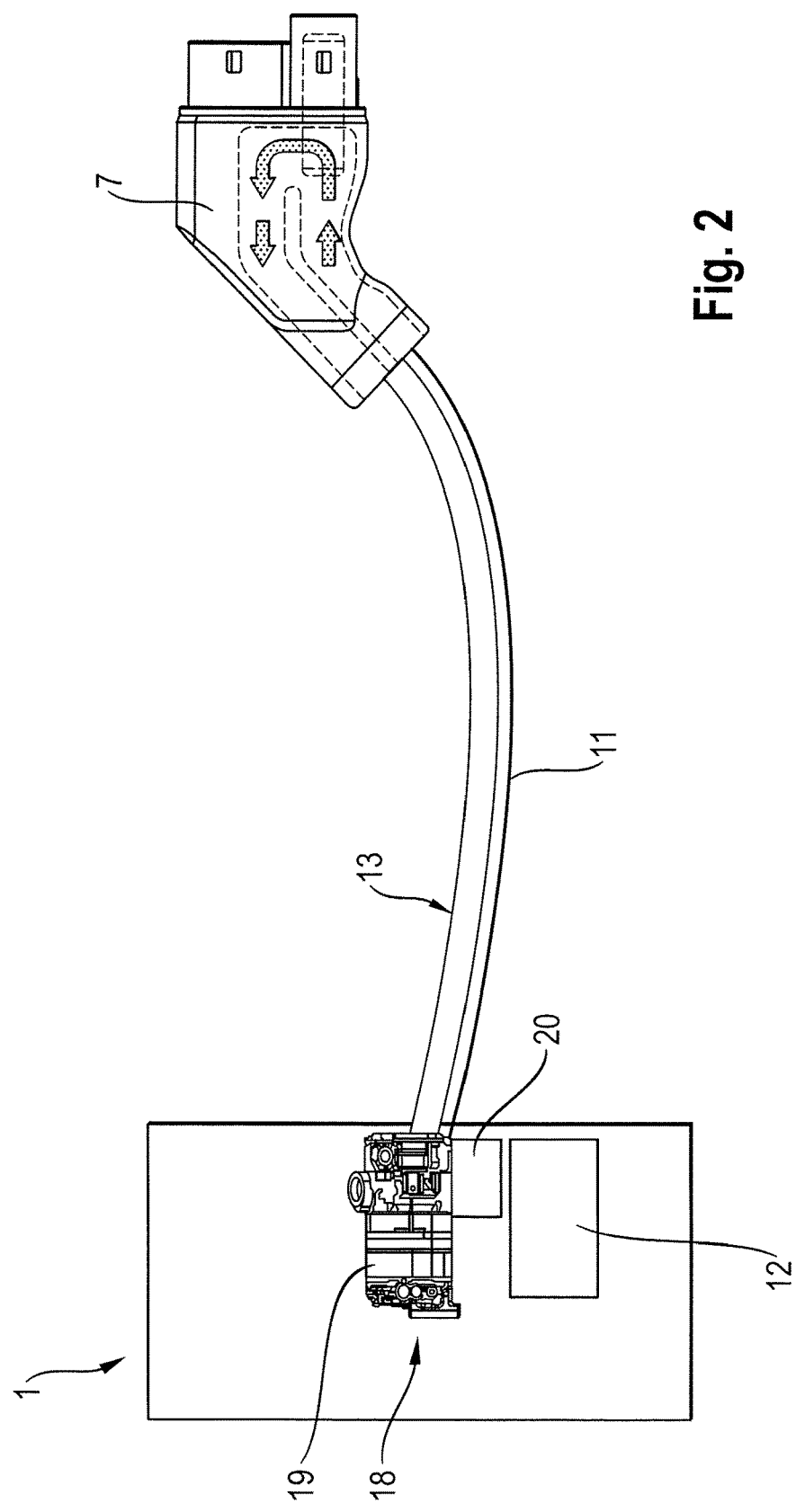
FIG. 2 shows a diagrammatic illustration of a charging station having a charging cable and a first plug-in apparatus.
Figure 3:
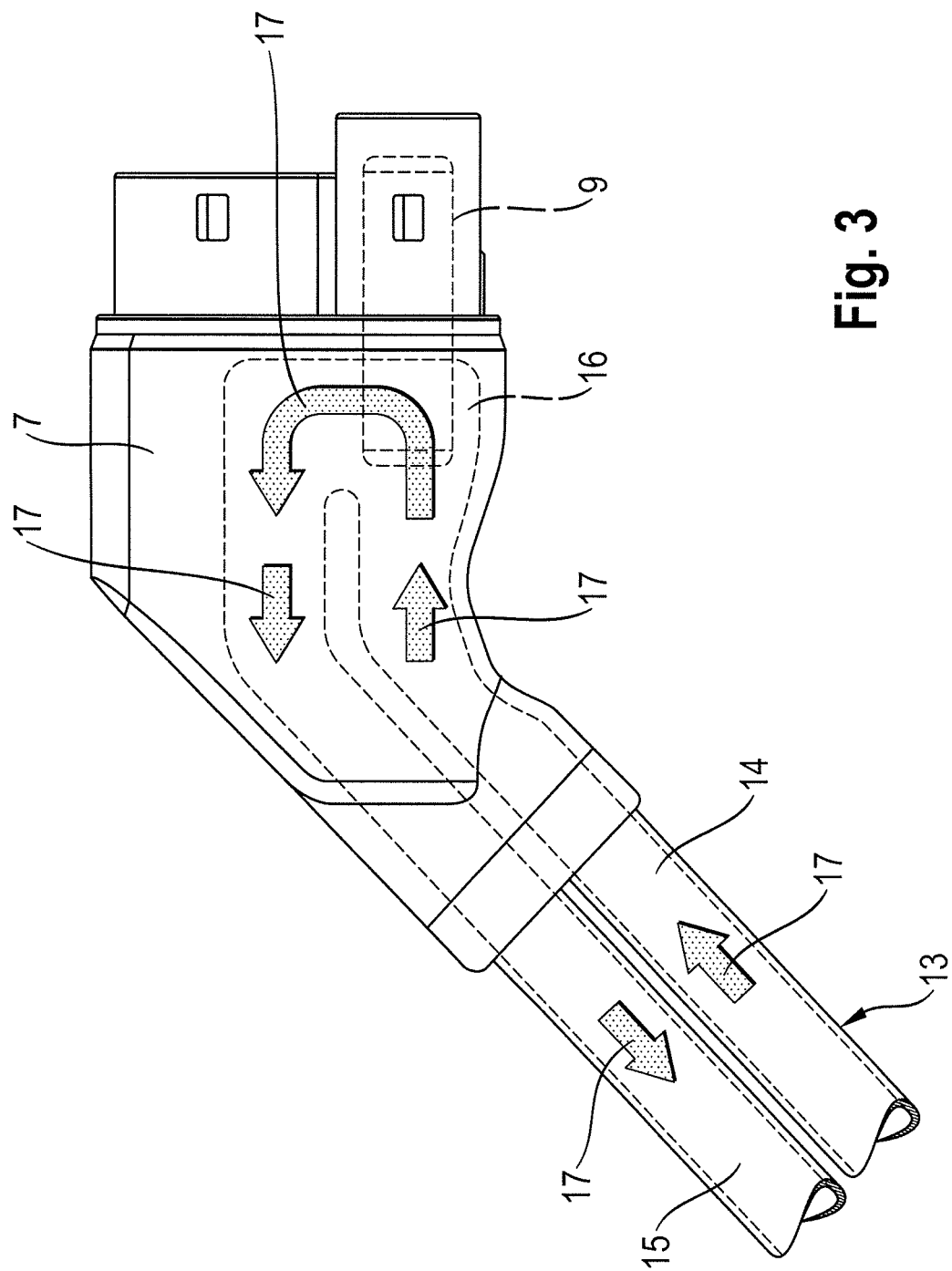
FIG. 3 shows an enlarged diagrammatic illustration of the first plug-in apparatus.
Figure 4:
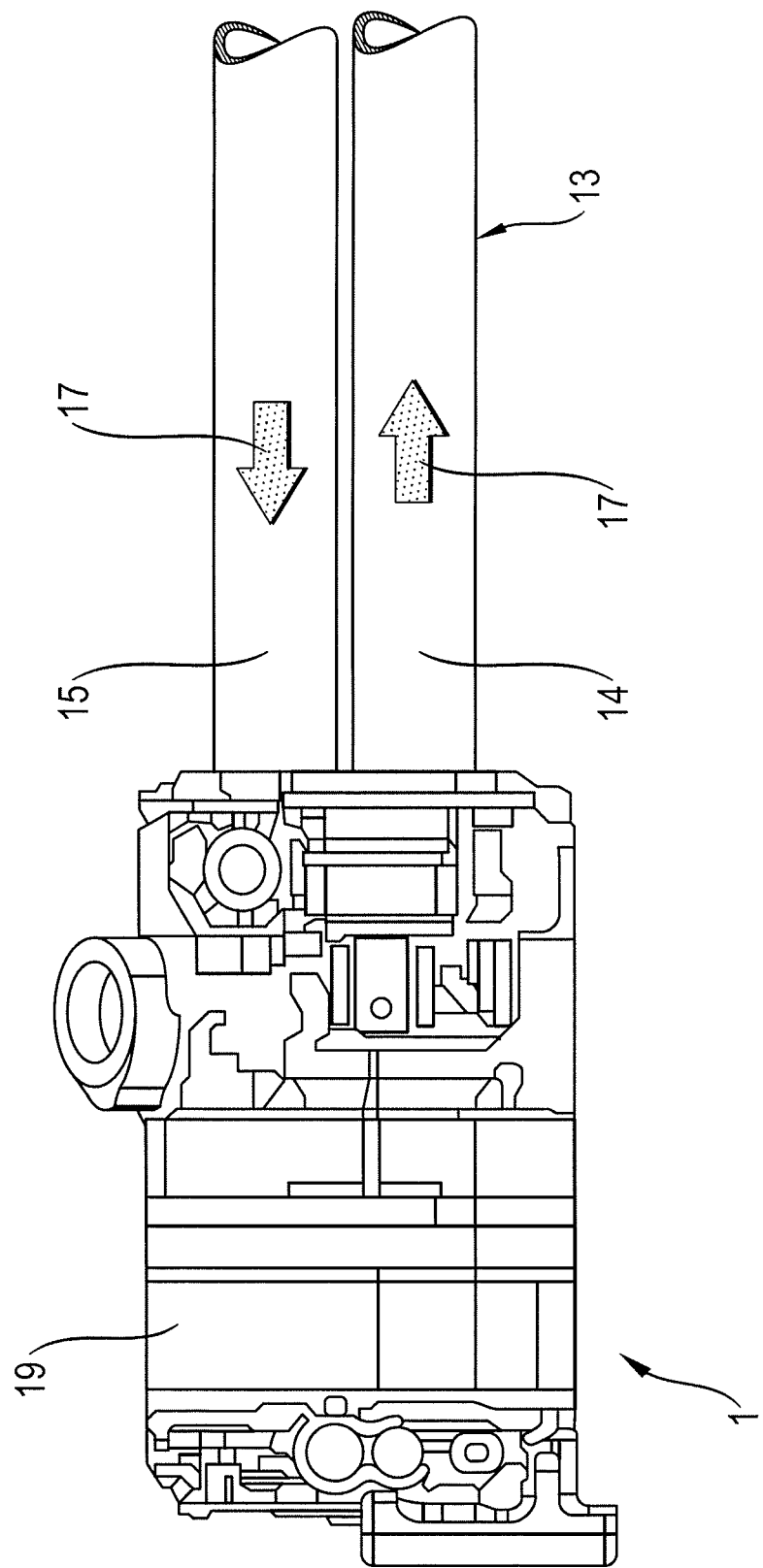
FIG. 4 shows an enlarged diagrammatic illustration of a detail of the charging station with a part of the charging cable.

FIGS. 1 to 4 show different views of one exemplary embodiment with a charging station 1 having a charging cable 2 for charging an electric energy store 3. The electric energy store 3 is part of an apparatus 4. The charging cable 2 is connected to the charging station 1 at a proximal end 5. The charging cable 2 is also configured with a first plug-in apparatus 7 at a distal end 6, for connecting to a second plug-in apparatus 8 of the apparatus 4 which is to be charged and contains an electric energy store 3. The first plug-in apparatus is advantageously configured as a plug, such as a male part of a plug, the second plug-in apparatus being configured as a female part of a plug. The first plug-in apparatus can likewise also be configured as a plug, such as a female part of a plug, it being possible for the second plug-in apparatus to be configured as a male part of a plug.

The first plug-in apparatus 7 has first electric contact elements 9 for electric connection to second electric contact elements 10 of the second plug-in apparatus 8.

The charging cable 2 has electrically connecting lines 11 for electric connection of the first contact elements 9 to a voltage source 12 of the charging station 1.

According to aspects of the invention, the charging cable 2 has a fluid duct 13 for guiding a fluid from the charging station 1 toward the first plug-in apparatus 7 and from the first plug-in apparatus 7 back to the charging station 1 again.

The fluid duct 13 has a first part fluid duct 14 and a second part fluid duct 15 which open in the region of the first plug-in apparatus 7 into a deflecting duct 16, in which a fluid from the first part fluid duct 14 downstream of the charging station 1 is deflected into the second part fluid duct 15, in the flow direction toward the charging station 1. As a result, coming from the charging station 1, a fluid can flow along the charging cable 2 and can be deflected in the deflecting duct 16, with the result that it can be guided back to the charging station again in the second part fluid duct 15.

For improved temperature control also of the first contact elements 9, said first contact elements 9 reach into the first part fluid duct 14, into the second part fluid duct 15 and/or into the deflecting duct 16, and/or the first contact elements 9 are connected thermally to the first part fluid duct 14, to the second part fluid duct 15 and/or to the deflecting duct 16. In one advantageous exemplary embodiment, the first contact elements 9 can be flowed around at least partially by the fluid, see arrow 17.

For the supply with fluid, the charging station 1 has a part fluid circuit 18 with at least one fluid pump or a fluid compressor 19 for loading a fluid through the first part fluid duct 14 toward the deflecting duct 16 and from the deflecting duct 16 through the second part fluid duct 15 back to the part fluid circuit 18.

According to a further aspect of the invention, the charging station 1 or the part fluid duct 14 has means 20 for controlling the temperature of the fluid 17. They can be, for example, electric heating means, such as resistance heating means, PTC heating means or a Peltier element, or electric cooling means, such as a Peltier element.

According to the concept of the invention, the fluid is air. This can be capable of being sucked, in particular, from the exterior space of the charging station 1. Another gas or gas mixture or a liquid can also be used which can be sucked, for example, from a reservoir. Here, the air can be blown out again after passing through the cooling circuit. As an alternative, the air or another fluid can also be guided in a closed cooling circuit and can be recooled again or heated again.

For instance, it is advantageous if, in addition to the electrically connecting lines 11, the charging cable 2 also has the part fluid ducts 14, 15, the electrically connecting lines 11 being thermally connected to the part fluid ducts 14, 15. As a result, temperature control of the electrically connecting lines can take place over their length or at least over a part length.

The charging station according to aspects of the invention has the advantage that, on account of the possible temperature control of the charging cable and the first plug-in apparatus, permanent operation can be possible, in particular 24/7 even at a maximum power output in an ambient temperature range of from approximately −30° C. to +60° C.

It is advantageously also achieved here that the surface heating to a maximum of 60° C. can be maintained, in order that no damage can occur on account of high temperatures.

For the temperature control according to aspects of the invention, a thermal sensor system is advantageously also provided, for example by means of infrared radiation, which allows the temperature of the first plug-in apparatus and/or the charging cable to be determined.

Furthermore, it is advantageous if there is an, in particular, standardized protocol for communication of the temperatures to the charging station.

As a result, temperature control which is intended to bring about maintenance of a reliable contact temperature can be performed if required.

This can also achieve a situation where maintenance of the maximum temperature of surfaces which can be touched can be effected.

The charging station is advantageously a high voltage charging station with charging voltages of up to 1000 V with up to 500 A.

What is claimed is:

1. A charging station having a charging cable for charging an electric energy store, the charging cable being connected to the charging station at a proximal end and having a first plug-in apparatus at a distal end for connecting to a second plug-in apparatus of an apparatus to be charged which contains an electric energy store, the first plug-in apparatus having first electric contact elements for electrically and conductively coupling to second electric contact elements of the second plug-in apparatus, the charging cable having electrically connecting lines for electric connection of the first contact elements to a voltage source of the charging station, wherein the charging cable has a fluid duct for guiding a fluid from the charging station toward the first plug-in apparatus and from the first plug-in apparatus back to the charging station again, wherein at least one of the first electric contact elements is positioned within the fluid duct such that said at least one of the first electric contact elements is exposed to and in fluid contact with the fluid within the fluid duct.

2. A charging station having a charging cable for charging an electric energy store, the charging cable being connected to the charging station at a proximal end and having a first plug-in apparatus at a distal end for connecting to a second plug-in apparatus of an apparatus to be charged which contains an electric energy store, the first plug-in apparatus having first electric contact elements for electric connection to second electric contact elements of the second plug-in apparatus, the charging cable having electrically connecting lines for electric connection of the first contact elements to a voltage source of the charging station, wherein the charging cable has a fluid duct for guiding a fluid from the charging station toward the first plug-in apparatus and from the first plug-in apparatus back to the charging station again, wherein the fluid duct has a first part fluid duct and has a second part fluid duct which open in a region of the first plug-in apparatus into a deflecting duct, in which the fluid from the first part fluid duct downstream of the charging station is deflected into the second part fluid duct, in a flow direction toward the charging station, wherein at least one of the first electric contact elements is positioned within the fluid duct such that said at least one of the first electric contact elements is exposed to and in fluid contact with the fluid within the fluid duct.

3. The charging station as claimed in claim 2, wherein the first contact elements engage into the first part fluid duct, into the second part fluid duct or into the deflecting duct or are connected thermally to the deflecting duct.

4. The charging station as claimed in claim 3, wherein the first contact elements are positioned such that the fluid at least partially flows around the first contact elements.

5. The charging station as claimed in claim 2, wherein a part fluid circuit is provided with at least one fluid pump or a fluid compressor for loading the fluid through the first part fluid duct toward the deflecting duct and from the deflecting duct back through the second part fluid duct and to the part fluid circuit.

6. The charging station as claimed in claim 5, wherein the charging station, the part fluid circuit or the first part fluid duct have means for controlling a temperature of the fluid.

7. The charging station as claimed in claim 6, wherein the means for controlling the temperature comprises a heating means for heating the fluid or cooling means for cooling the fluid.

8. The charging station as claimed in claim 1, wherein the fluid is air which can be sucked in from an exterior space of the charging station, or the fluid is another gas or gas mixture or a liquid which can be sucked in from a reservoir.

9. The charging station as claimed in claim 2, wherein, in addition to the electrically connecting lines, the charging cable also has the first and second part fluid ducts, the electrically connecting lines being in thermal connection with the first and second part fluid ducts.

10. The charging station as claimed in claim 2, wherein the electrically connecting lines are connected in an electrically insulated but thermally conducting manner with respect to the first and second part fluid ducts.

11. The charging station as claimed in claim 2, wherein the deflecting duct has a larger cross-section than either the first part fluid duct or the second part fluid duct.

12. The charging station as claimed in claim 1, wherein the first electric contact element is one of a male part and a female part, and the second electrical contact element is the other of the male part and the female part, wherein the male part is configured to be electrically and conductively coupled to the female part for conducting electricity therebetween.

* * * * *